United States Patent
Heffield et al.

[19]

[11] Patent Number: 6,009,323
[45] Date of Patent: Dec. 28, 1999

[54] METHOD OF PLACING A CALL IN A TWO-WAY RADIO COMMUNICATION SYSTEM

[75] Inventors: Timothy W. Heffield, Sunrise; Craig G. Bishop, Boca Raton; David E. Willis, Sunrise, all of Fla.

[73] Assignee: Motorola, Inc., Schaumburg, Ill.

[21] Appl. No.: 08/846,450

[22] Filed: May 1, 1997

[51] Int. Cl.⁶ .................................................. H04Q 7/06
[52] U.S. Cl. .................. 455/414; 455/425; 379/88.22; 379/88.23; 379/93.23; 379/201; 370/296
[58] Field of Search ..................... 455/414, 419, 455/425, 415; 379/88.14, 88.19, 88.11, 88.25, 88.23, 88.28, 88.22, 204, 201, 93.23; 370/296

[56] References Cited

U.S. PATENT DOCUMENTS 5,337,347  8/1994  Halstead-Nussloch et al. ..... 379/88.14
5,339,352  8/1994  Armstrong et al. .................... 455/414
5,689,547  11/1997  Molne ..................................... 379/379

Primary Examiner—Wellington Chin
Assistant Examiner—Isaak R. Jama
Attorney, Agent, or Firm—Andrew S. Fuller

[57] ABSTRACT

A method is provided for placing a call from a two-way radio subscriber unit operating within a two-way radio communication system (100). A user operates the subscriber unit in a call address search mode (310), and provides search criteria data that references a communication target (320). The search criteria data is transmitted in a query to system equipment which provides, in response, a list of matching identifiers and corresponding call addresses (330, 340). This list is presented to the user and a selection obtained (350, 360). A call address corresponding to the user selection is used to initiate the call to the communication target (370).

2 Claims, 4 Drawing Sheets

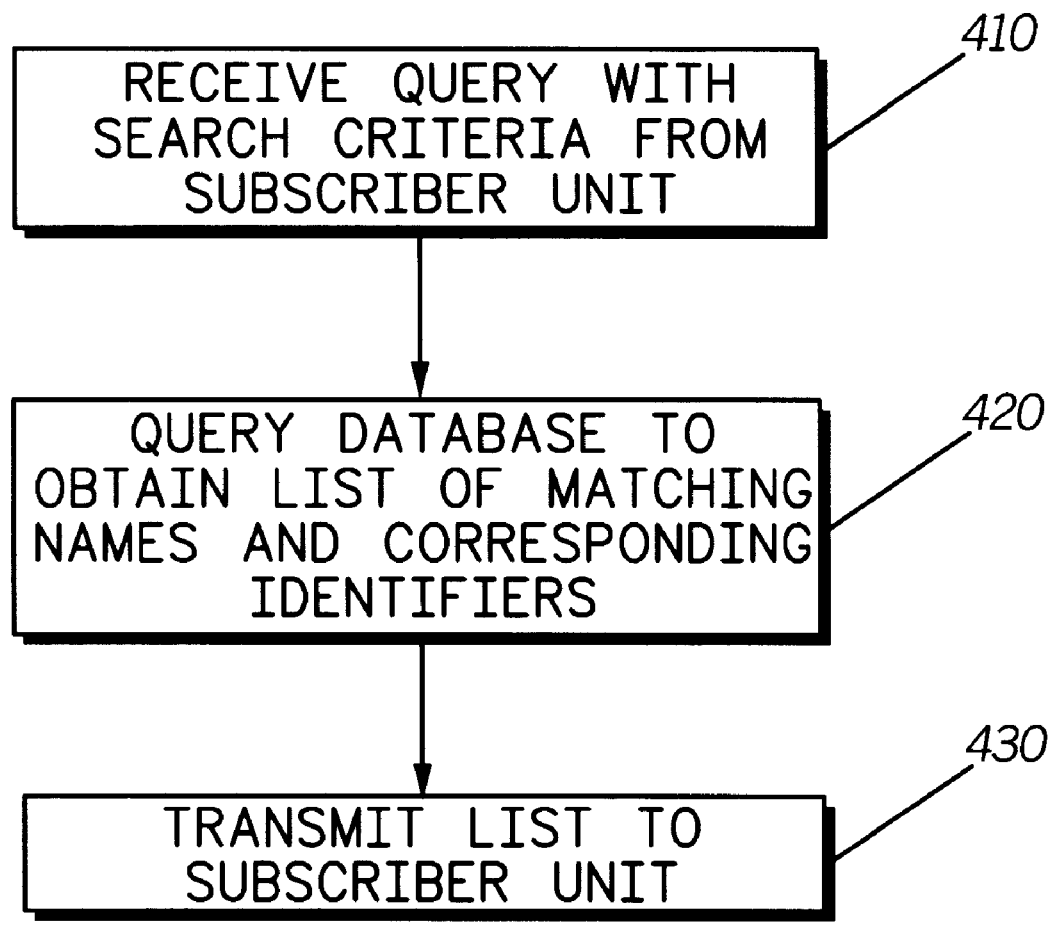

METHOD OF PLACING A CALL IN A TWO-WAY RADIO COMMUNICATION SYSTEM

TECHNICAL FIELD

This invention relates in general to radio communication systems, and more particularly, to procedures for placing a call from a subscriber unit operating within a radio communication system.

BACKGROUND

In many radio communication systems, a subscriber unit is provided with features for initiating calls to a target communicant. For example, a subscriber unit operating within a two-way dispatch radio system may offer various operation modes, including a dispatch or instant conferencing mode, and direct call modes, such as telephone interconnect and private call. In dispatch mode, a call is transmitted on an open communication channel, which may be selected at the subscriber unit, or provided by the system. In direct call mode, a call is initiated using a communication target identifier, such as a call number. Thus, a direct call generally requires prior availability of a target unit identifier. This target unit identifier may be known by the user, or may be stored in a preprogrammed list at the subscriber unit. A problem occurs when the target unit identifier is unknown or has changed. The user may then require assistance in obtaining the correct target unit identifier.

Telephone systems offering directory assistance are known. For example, U.S. Pat. No. 5,339,352, issued to Armstrong, et al. on Aug. 16, 1994, describes Directory Assistance Call Completion Via Mobile Systems. Here, a cellular radio system interfaces with an operating service system to obtain telephone number information from an identified directory listing. Such systems, while providing a useful service, require human interaction and are expensive to operate.

It is desirable to provide for the placement of calls from a subscriber unit operating within a radio communication system, when a target unit identifier is not locally available. Therefore, a new method of placing a call in a radio communication system is needed.

BRIEF DESCRIPTION OF THE DRAWINGS

FIG. 4 is a flowchart of procedures used by system infrastructure equipment to respond to queries from a subscriber communication device for unit call identifier information, in accordance with the present invention.

DETAILED DESCRIPTION OF THE PREFERRED EMBODIMENT

The present invention provides for a method of placing a call from a two-way radio communication subscriber unit operating within a radio communication system. A user initiates a call by operating the subscriber unit in a call identifier/address search mode. The user then inputs search criteria data for identifying a target communicant. Preferably, the search criteria data contains at least a portion of a name. A query is then transmitted to system infrastructure equipment, which query includes the search criteria data. The subscriber unit receives, in response to the query, a list of matching names and call identifiers. The list is then presented to the user, preferably by display, and a call is initiated to the target communicant using a call identifier corresponding to a user selection from the list.

Figure 1:
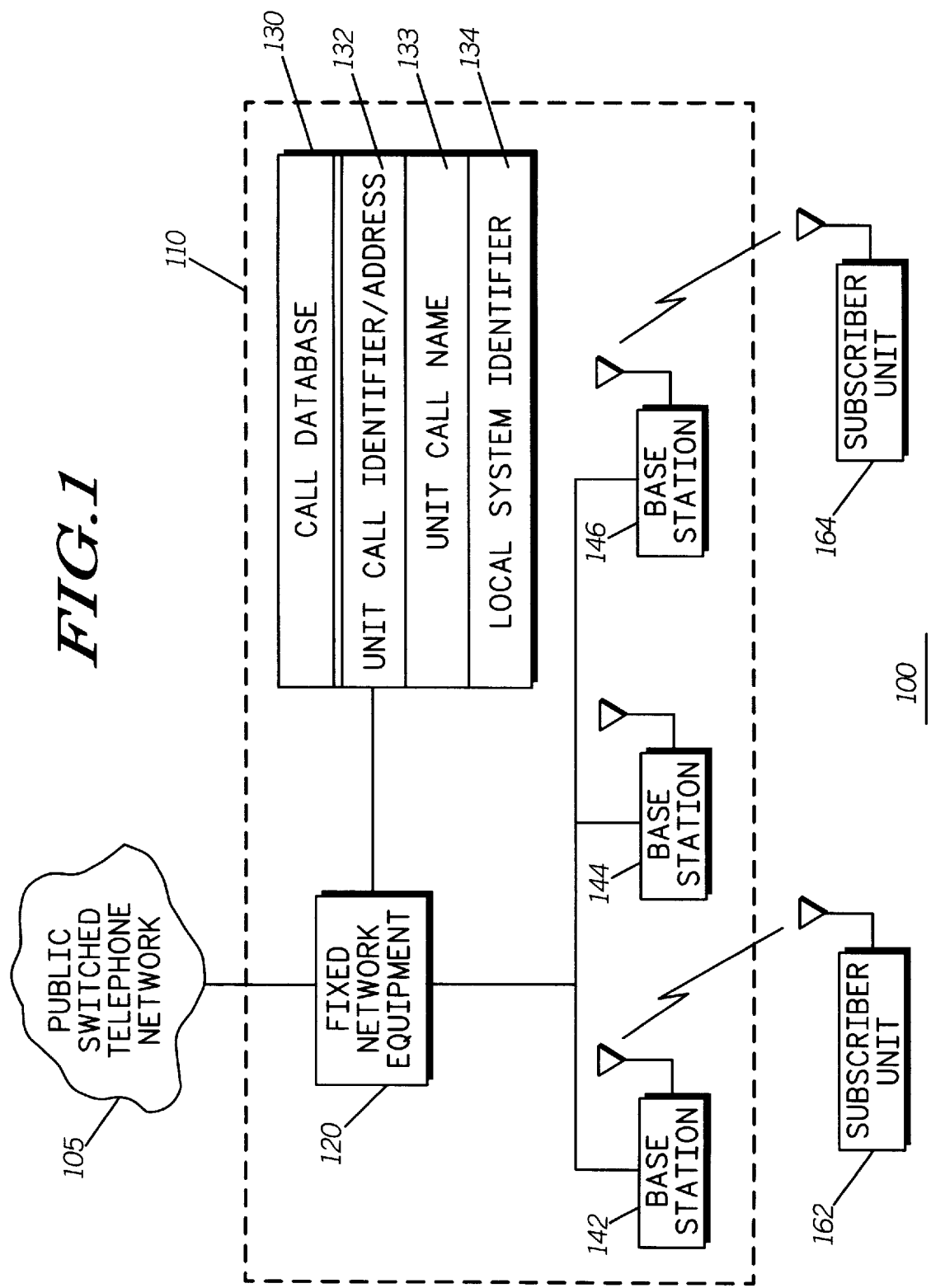
FIG. 1 is a block diagram of a two-way radio communication system, in accordance with the present invention.

FIG. 1 shows a block diagram of a radio communication system 100, in accordance with the present invention. The radio communication system 100 includes system infrastructure or provider equipment 110, which is coupled to a public switched telephone network 105, and to subscriber units 162, 164. The infrastructure equipment 110 includes fixed network equipment 120 and base stations 142, 144, 146. In the preferred embodiment, the fixed network equipment 120 performs communication management and access control for the subscriber units 162, 164, in a manner well known in the art. The fixed network equipment 120 interfaces with the public switched telephone network 105 to provide a gateway for routing telephone calls between the radio communication system and the public telephone network. The base stations 142, 144, 146 are coupled to the fixed network equipment 120, and are ordinarily geographically dispersed to service subscriber units in specific geographic regions. The subscriber units 162, 164 are radio communication devices that interface with the fixed network equipment 120 via communication links established with base stations 142, 144, 146. The subscriber units may be portable or mobile radio telephones that work in conjunction with the system infrastructure equipment to provide a user with services such as telephone interconnect, dispatch or instant conferencing, private calls in simplex or duplex communication modes, and combinations thereof, as well as other data services. Ordinarily, communication between subscriber units 162, 164, or between a communicant external to the radio communication system 100 and a particular subscriber unit 162, 164, is routed through the system infrastructure equipment 110.

According to the present invention, the system infrastructure equipment 110 includes support for the retrieval of call identifier information from a subscriber unit for call completion purposes. As such, the infrastructure equipment includes a call database 130 that is coupled to the fixed network equipment 120. The call database includes entries such as a unit call identifier or address 132, a unit call name 133, and a local system identifier 134. The unit call identifier (also referred to herein as a call address) 132 is a sequence of characters or digits which is used to place a direct call from a subscriber unit to a target communicant. In the preferred embodiment, the call identifier 132 corresponds to a private call number which is used to initiate direct simplex communication between one subscriber unit and another subscriber unit. The unit call name 133 is ordinarily a user name associated with the unit call identifier 132. This unit call name typically consists of a person's name, but may include other forms of identifiers. The local system identifier 134 may accommodate a registration number or electronic serial number that is used by the system to identify a specific subscriber unit. The database 130 is indexed at least by the unit call name 133.

Figure 2:
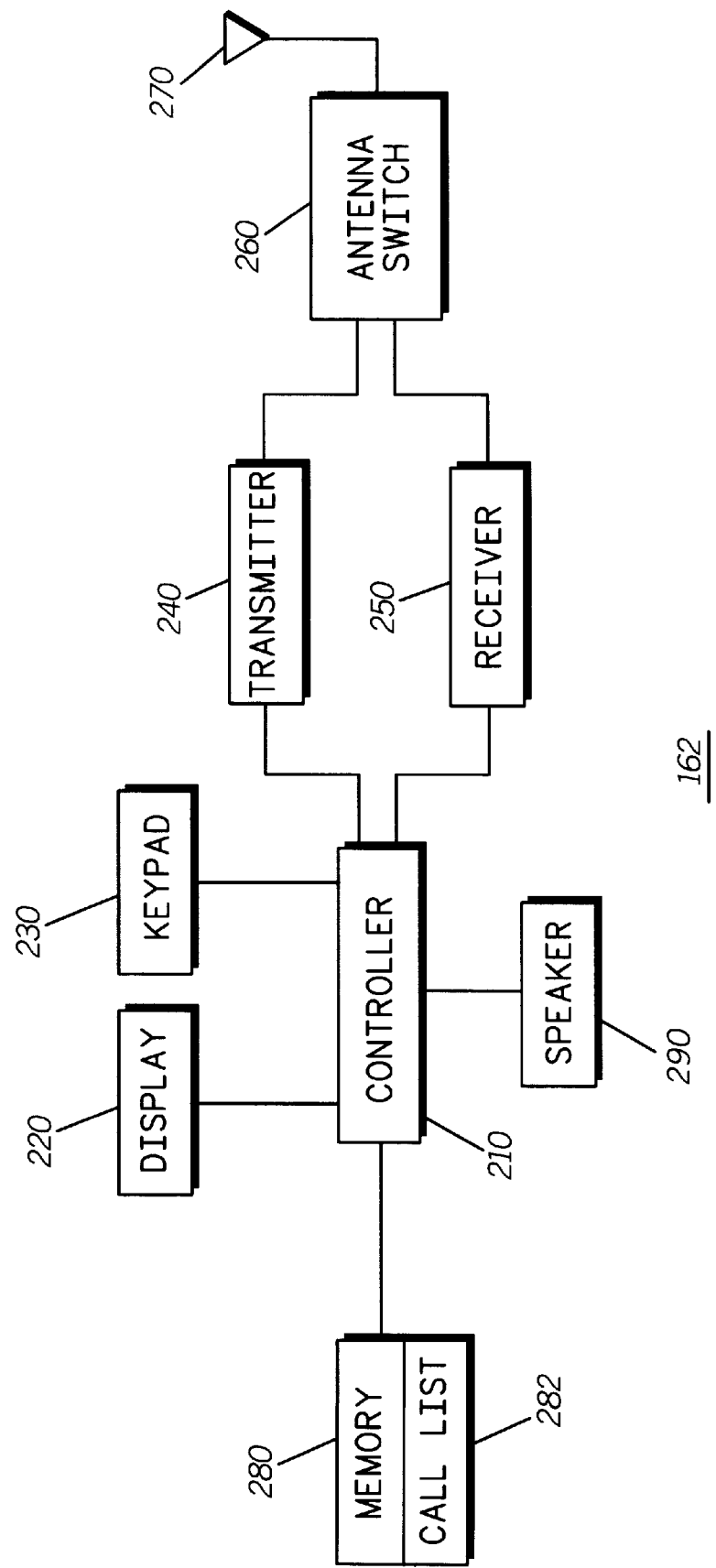
FIG. 2 is a block diagram of a subscriber radio communication device operating within the system of FIG. 1, in accordance with the present invention.

FIG. 2 shows a block diagram of a radio communication device, such as subscriber unit 162, in accordance with the present invention. Other subscriber units 164 are similarly constructed. The communication device 162 is operable to initiate calls via the provider equipment 110 to another subscriber unit or other target communicant. The communication device 162 is preferably a two-way radio or radio telephone that is operable to provide telephone interconnect, dispatch, paging, private call and data services. In the radio 162, a controller 210 is coupled to a memory 280, to a transmitter 240, and to a receiver 250. The transmitter 240 and the receiver 250 are coupled via an antenna switch 260 to an antenna 270. For transmit operations, the controller 210 configures the antenna switch to couple the transmitter 240 to the antenna 270. Similarly, for receive operations, the controller 210 couples the antenna 270 via the antenna switch 260 to the receiver 250. Receive and transmit operations are conducted under instructions stored in the memory 280. The radio 162 also includes a display 220, a keypad 230, and a speaker 290, that together provide a user interface for accessing radio functions. The memory 280 includes a non-volatile portion that stores a call list 282. The call list 282 is a preprogrammed list of user names and call identifiers which may be updatable, such as from keypad entries, or from information received from the system after a call identifier search request. The radio communication device is operable in a call identifier search request mode in which a name or a portion thereof is entered via the keypad, and is used to retrieve a matching list of names and corresponding identifiers.

Figure 3:
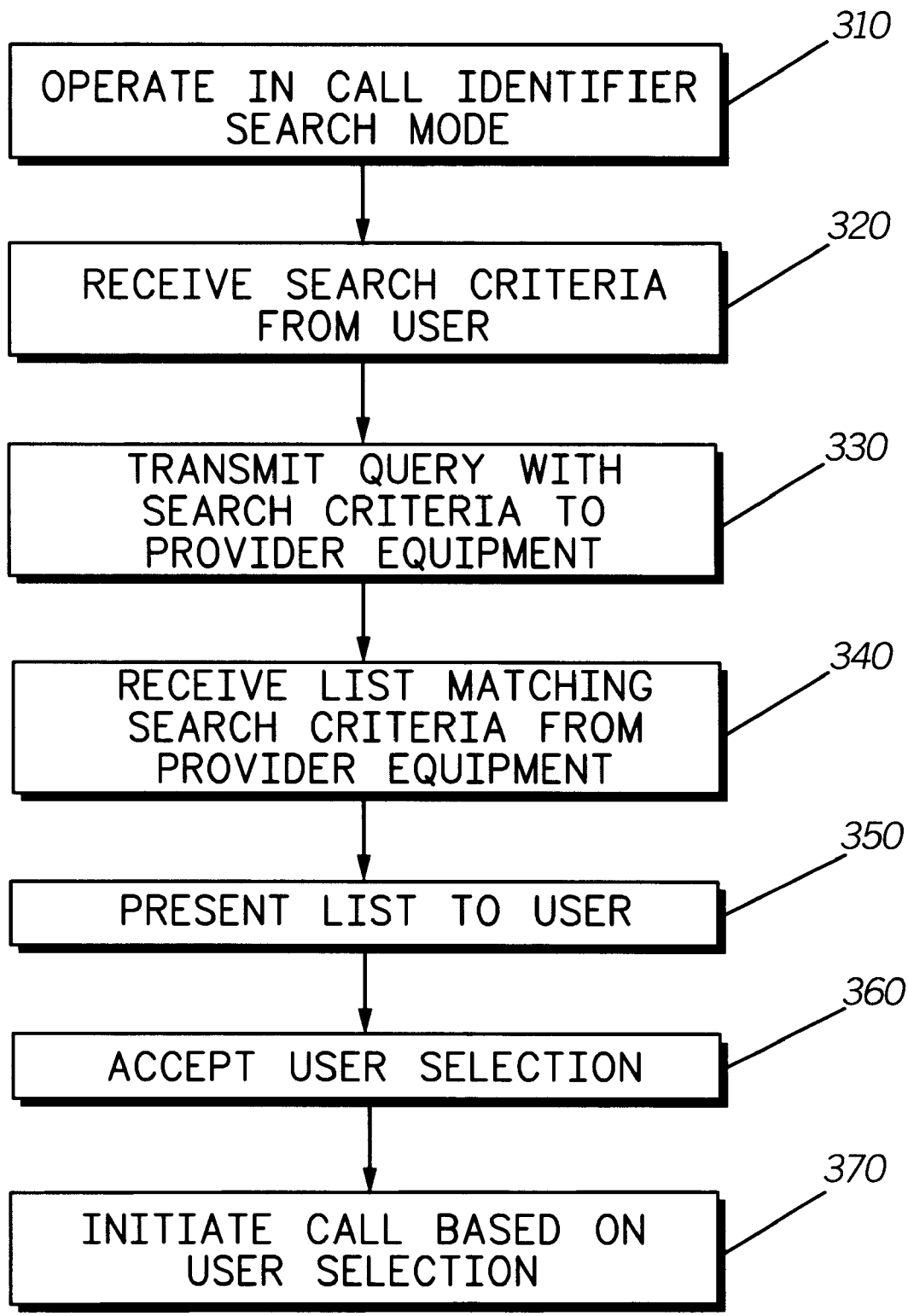
FIG. 3 is a flowchart of procedures for operating the radio communication device of FIG. 2, in accordance with the present invention.

FIG. 3 shows a flowchart of procedures used at the communication device 162 to place a call, in accordance with the present invention. In a typical operation, a user wishing to initiate a call places the radio communication device in a call mode and enters the call identifier in some manner. For example, the call identifier may be directly entered through the keypad or may be selected from the preprogrammed call list. However, according to the present invention the radio communication device is operable to retrieve call identifier information from a remote site, that in the preferred embodiment, function as provider equipment within the two-way radio communication system. This capability is accessed by operating the radio communication device in a call address search mode, step 310. The communication device then accepts user input of search criteria data for identifying a target communicant, preferably from an integrated keypad, step 320. Ordinarily, the search criteria data received from the user includes at least a portion of a name or other identifier corresponding to a communication target. A query is then formed that includes the search criteria data. This query is transmitted to provider equipment within the two-way radio communication system, step 330. Preferably the subscriber unit also transmits a subscriber unit identifier, that can be used to internally track the subscriber unit within the radio communication system.

FIG. 4 is a flowchart of procedures showing operation of the provider equipment in response to the query, in accordance with the present invention. The provider infrastructure equipment receives the query with the search criteria data from the subscriber unit on a wireless communication channel, step 410. The provider infrastructure equipment then queries a database to obtain a list containing names and corresponding call identifiers that match the search criteria data, step 420. Optionally, when the database is queried, access may be limited to items in the database based on the subscriber unit identifier. In this manner, additional security is provided and access to call identifiers restricted. The list of names and identifiers is then transmitted to the requesting subscriber unit, step 430.

Referring back to FIG. 3, the subscriber unit receives, in response to the query, a list of identifiers and corresponding call addresses that match the search criteria data, step 340. This list, or at least a portion of it, is presented to the user via visual or aural representation, step 350. In the preferred embodiment, the list is outputted on a display integrated with the subscriber unit. The subscriber unit then accepts a user selection identifying an entry on the list of matching names and call identifiers, which entry corresponds to the target communicant, step 360. A call is then initiated to the target communicant using the call identifier corresponding to the user selection, step 370. In the preferred embodiment, a private call is initiated, i.e., a direct simplex mode communication link between the subscriber unit and another subscriber unit operating within the two-way radio communication system.

Once identified, the name and call identifier corresponding to the user selection may be stored in non-volatile memory of the subscriber unit. Preferably, an internal list of name and call identifiers is maintained in nonvolatile memory of the subscriber unit. This list is automatically updated with information from the list of matching names and call identifiers received in response to the query.

The present invention offers significant advantages. A user of a subscriber unit may place a call using automated supplementation of incomplete information on a target communicant. Additionally, automatic maintenance of a preprogrammed call list is facilitated.

What is claimed is:

1. In a two-way radio communication system having infrastructure equipment and a subscriber unit, a method comprising the steps of:

at the subscriber unit:
accepting user input of a search criteria data for identifying a private call identifier for establishing a direct simplex mode communication link between the subscriber unit and another subscriber unit operating with the two-way radio communication system;
transmitting to the infrastructure equipment, by wireless signal, a query that includes the search criteria data;
receiving, in response to the query, a list of matching names and call identifiers;
displaying the list of matching names and call identifiers;
accepting a user selection identifying an entry on the list of matching names and call identifiers, which entry corresponds to the target communicant; and
requesting a direct simplex mode communication link between the subscriber unit and another subscriber unit operating with the two-way radio communication system using the call identifier corresponding to the user selection.

2. The method of claim 1, further comprising the steps of:

maintaining an internal list of names and call identifiers; and automatically updating the internal list with information from the list of matching names and call identifiers received in response to the query.

\* \* \* \* \*